July 1, 1947.  S. C. HURLEY, JR  2,423,320
WELDER'S HELMET
Filed July 29, 1944
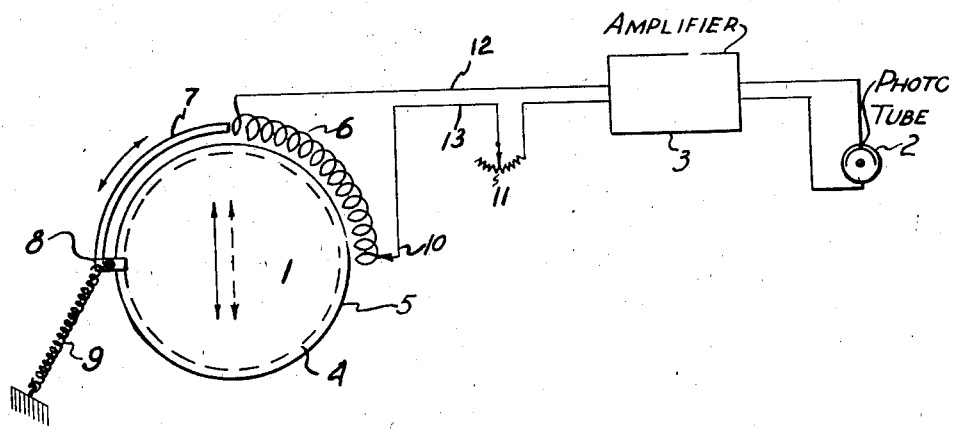
FIG. 1
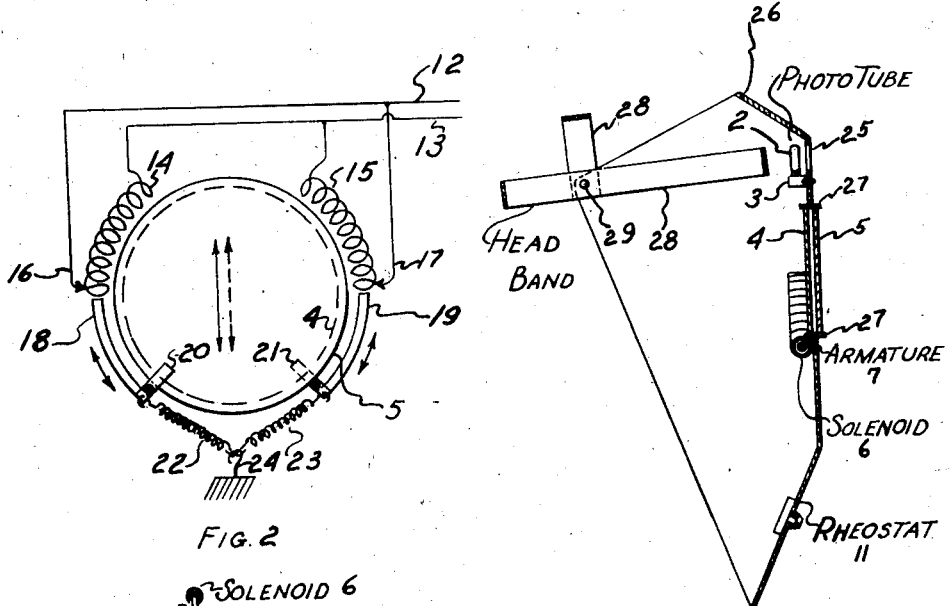
FIG. 2
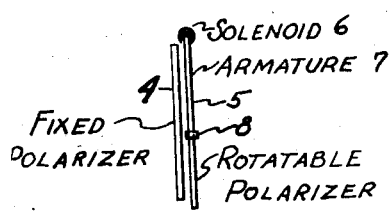
FIG. 3
FIG. 4
INVENTOR.
SAMUEL C. HURLEY JR.
BY Benedict & Swartwood
ATTORNEYS Patented July 1, 1947

2,423,320

UNITED STATES PATENT OFFICE 2,423,320

WELDER'S HELMET

Samuel C. Hurley, Jr., Danville, Ill.

Application July 29, 1944, Serial No. 547,209

4 Claims. (Cl. 2—8)

This application relates to an apparatus for controlling illumination in workmen's helmets and, more especially, welders' helmets.

More specifically, the invention relates to an apparatus for regulating the amount of light transmitted through a viewing device under conditions in which the operator is subjected to rapid changes in light intensity, from a condition of approximately normal illumination to one of intense illumination.

It is an object of my invention to provide a device for regulating the amount of light transmitted so as to reduce glare and the resultant discomfort and, in some cases, danger attendant the exposure to intense light, particularly light which varies with great rapidity.

Another object of the invention is to provide means for excluding light of wave lengths which may be harmful to the operator.

A further object is to provide a helmet containing a viewing device which will automatically adjust the light intensity reaching the eyes of the operator without the necessity for making manual adjustments with each change in illumination thereby leaving the wearer's hands free to carry out his occupation uninterruptedly.

In one embodiment, my invention comprises an ophthalmic device comprising at least two polarizing elements movable in respect to each other whereby the light transmittable by the device may be adjusted, the movement being responsive to and controlled by a light sensitive device.

A further advantage of my device lies in the fact that a light, compact viewing mechanism can be used, particularly in connection with lighting conditions and surroundings which are subject to rapid and, many times, irregular changes in illumination. For example, a welder is subjected to changes in illumination due to the operations which he, himself, is carrying out, and if he is working in the vicinity of other welders, he is simultaneously subjected to illumination from their operations, a matter over which he has no control. With the present invention, his eyes are automatically protected when a change in illumination occurs in his line of vision, either from his own operations or those of nearby workmen.

Another advantage lies in the fact that the workman can have his hands free at all times to carry on his usual work. The present practice of welding is to place a relatively opaque filter in a heavy, bulky helmet which is hinged and which may be lifted from the operator's face without removing it from his head. The purpose of the helmet is two-fold: (1) to protect the eyes and skin from harmful ultra-violet rays of which the light from welding operations contains a large percentage, and (2) to protect against flying particles of molten metal. The character of the filter in the welder's helmet is such that in the absence of intense light, the workman cannot see through the filter; therefore, in order to carry out any type of adjustment of the work before him, it is necessary for him to lift the helmet from in front of his face. With the present apparatus, the necessity for this is done away with since the illumination reaching the workman's eyes is adequate at all times whether the arc is in operation or not, assuming that the normal illumination is otherwise adequate. Thus, a welding operation can be carried out and intermittent adjustments made relative to the work without inconvenience.

Another advantage is that the invention permits a radical re-designing of workmen's helmets so as to permit the worker to have a gas-tight helmet and permit him to work under conditions wherein he could operate only with extreme difficulty when using the usual type of equipment. Gas masks and gas-tight helmets with air hoses, or the like, could be used with my apparatus thereby permitting the welder to work in an atmosphere of poison gas, smoke, etc., wherein special breathing equipment must be provided.

Workers around steel mills, foundries, blast furnaces, etc., who may be subjected to changes in illumination of a wide character will find the device useful. For example, in steel mills, during certain operations, the room may be brilliantly lighted in certain portions and the light may be so intense that the unprotected workmen facing it would be partially blinded by the glare. At the same time, other portions of the surroundings may be relatively poorly illuminated. The workmen may be required by their occupation to alternately face and turn away from the light. It is apparent that they cannot work with the greatest safety and comfort under these conditions because of the fact that the eyes must adjust themselves to each change in the illumination. With this device, light may be held below an undesirable point and, in certain cases, may even be held constant so that the worker is at all times working in a safe and comfortable illumination range without the need for making manual adjustments.

The apparatus may be further understood by reference to the accompanying drawings.

Figure 1 is a schematic representation of one way of carrying out my invention.

Figure 2 is a schematic illustration of a method in which both polarizing elements are rotatable.

Figure 3 is a side view of the apparatus illustrated in Figure 1.

Figure 4 is a vertical section of a welder's helmet to which the device may be applied.

Referring to Figure 1, polarizing unit 1 consists of two polarizing elements 4 and 5 which are superimposed, one upon the other, in a substantially parallel arrangement as is indicated by the solid and dotted arrows, these elements are preferably arranged in such a way that the light transmitting axes are substantially parallel. Thus, light striking one of the elements is plane polarized and will pass through the second element.

Photoelectric tube 2 is arranged so as to receive light from a source which will be viewed by the wearer of the device. This tube is preferably arranged in such a way that it will "see" the same light that the workman sees. Current passing through the phototube is amplified by amplifier 3 and passes to solenoid 6. If the current is sufficiently strong, the solenoid will attract armature 7 which is attached to polarizing element 5 by means of bracket 8 and is held in the normal position by means of spring 9 which may be anchored in any suitable way. The polarizing element 4 is held in fixed relationship to element 5 under normal conditions. When element 5 is rotated by means of the solenoid, the light transmitting axes of the two are therefore crossed. The amount of light which will pass through element 4 is dependent upon the degree of rotation of element 5. The amount of rotation can be manually adjusted by means of the sliding contact 10 and an appropriate adjustment. In operation, when normal light strikes the phototube, the device is so regulated that there is no rotation of the polarizing elements. The point at which the element may be rotated can be adjusted by means of rheostat 11 or by making proper adjustments within the amplifying system. The degree of rotation may be adjusted by moving the slider 10, which, in effect, cuts out a certain portion of the solenoid 6. Armature 7 tends to "bottom" when sufficient current is passed through the solenoid; therefore, if the device were not adjustable, the amount of rotation would always be the same. However, under certain conditions, it may be desirable to have more or less rotation and this is a means of providing it. Other methods may also be used: for example, an adjustable stop in the solenoid.

Under certain conditions, it is desirable to provide a helmet which will maintain a substantially constant light on the operator. In the case of the welder, the maximum amount of light is a fairly constant value due to the fact that the intensity of the arc is approximately the same at all times. However, in some cases, there may be a wide variation in the intensity of the strong light to which the worker is subjected. In this case, means such as a reversible motor may be used to rotate the polarizer and to keep the light reaching his eyes fairly constant below some maximum value.

Referring to Figure 2, the polarizing elements 4 and 5 are both rotatable in this illustration. Leads 12 and 13 from the amplifier connect with the solenoids 14 and 15 which are variable in the same manner as in Figure 1, by proper adjustment of the variable switches 16 and 17. Armatures 18 and 19 are fastened to brackets 20 and 21 and are held in the normal position by springs 22 and 23 attached to anchor 24. It will be noted that the normal position of the polarizing elements is with their transmission axes substantially parallel. It is within the scope of my invention to adjust the position of the polarizers, to permit selection of the extent of illumination which will normally reach the eyes of the wearer.

When the illumination striking the phototube exceeds a certain value, the armatures 18 and 19 will be attracted by solenoids 14 and 15 causing the polarizing elements to rotate in opposite directions, thereby reducing the light passing through. The advantage of this particular apparatus lies in the fact that the degree of rotation required to reduce the light transmitted is half of that required when only one of the elements is rotatable.

In Figure 3, it will be noted that the polarizing elements 4 and 5 are in substantially parallel relationship.

Figure 4 shows a vertical section of one plan for applying the invention to the welder's helmet. Phototube 2, which may be supported on amplifier 3 in the upper portion of the helmet or shield 26, may be positioned behind a polarizer element 25 although in some cases the polarizer 25 may contain plain glass. The advantage of having a polarizing element in the aperture is that the amount of illumination striking the tube will be the same as that passing through the polarizing unit when the light intensity is not sufficient to cause it to rotate. This will compensate for minor variations in light intensity and make for better operation of the apparatus. Polarizing elements 4 and 5 are held in an aperture in shield 26 by any suitable means such as brackets 27. The armature 7 and solenoid 6 are placed in close proximity to the rotating polarizing element but are preferably positioned so that they will not interfere with the workmans' vision. Rheostat 11 may also be positioned on the shield when using the invention in connection with a workman's helmet of conventional type, head bands 28 pivoted at points 29 may permit the helmet to be lifted in the usual manner.

It is within the scope of the invention that certain portions of the apparatus be carried on the body of the workman. For example, the amplifier and the batteries necessary to operate the apparatus may be enclosed in a small case and placed in the workman's pocket, thus eliminating a part of the weight and bulk of the head piece.

In the case of welders' helmets and the like, the source of power may be that used for arc welding, or some other similar source. In this case, suitable lines, jacks and plugs may be added. If the line voltage is too high a transformer may be needed to operate the helmet. Such a device has utility particularly where the welder is not required to move about to any great extent. The lines can be incorporated in the line furnishing power to the electrode.

It is also within the scope of the invention that a pane of ordinary glass be placed in front of the polarizing unit to protect it from hot metal which may fly from the workman's torch or arc. In the event that an excessive amount of ultra-violet rays or light of other wave lengths passes the polarizing unit, a filter to take out portions of the undesired light may be used. The filter should not be opaque to ordinary daylight or artificial light.

The invention should not be interpreted as limited to the exact apparatus above described or embodiments of the illustrations.

I claim as my invention:

1. A workman's eye shield and helmet comprising head engaging bands and a shield supported thereby and a light transmitting viewing unit supported by said shield, said light transmitting unit comprising a first polarizing element, a second polarizing element superimposed adjacent to the first polarizing element with polarization axes of said elements substantially normally parallel, said second polarizing element being mounted for rotation through an angle of about 90° with respect to the polarizing axis of the first polarizing element, a photoelectric device supported by said shield in a position to receive light from the same source as said light transmitting unit, power means engaging at least one of the polarizing elements to rotate it, said power means being operatively controlled by the photoelectric device to rotate said rotatable polarizer to maintain the light passing through said light transmitting unit within predetermined limits, and adjustable means operatively associated with said photoelectric device and said power means for adjusting the degree of rotation of said element resulting from a predetermined change in light intensity.

2. A workman's eye shield and helmet comprising head engaging bands and a shield supported thereby and a light transmitting viewing unit supported by said shield, said light transmitting unit comprising a pair of superimposed polarizing elements mounted with polarization axes substantially normally parallel, said elements being mounted for relative rotation through an angle of about 90° with respect to the polarizing axes of each other, a photoelectric device supported by said shield to receive light from the same source as said light transmitting unit, power means engaging said polarizing elements for rotating them in opposite directions to maintain the light passing through said light transmitting unit within predetermined limits, said power means being operatively controlled by the photoelectric device.

3. The apparatus of claim 1 further characterized by a third polarizing element positioned between said photoelectric device and the source of light.

4. A workman's eye shield and helmet comprising head engaging bands and a shield supported thereby and a light transmitting viewing unit supported by said shield, said light transmitting unit comprising a first polarizing element, a second polarizing element superimposed adjacent to the first polarizing element with polarization axes of said elements substantially normally parallel, said second polarizing element being mounted for rotation through an angle of about 90° with respect to the polarizing axis of the first polarizing element, a photoelectric device supported by said shield in a position to receive light from the same source as said light transmitting unit, power means engaging at least one of the polarizing elements to rotate it, said power means being operatively controlled by the photoelectric device to rotate said rotatable polarizer to maintain the light passing through said light transmitting unit within predetermined limits.

SAMUEL C. HURLEY, Jr.

REFERENCES CITED

The following references are of record in the file of this patent:

UNITED STATES PATENTS

| Number | Name | Date |
| --- | --- | --- |
| 2,058,169 | Montague | Oct. 20, 1936 |
| 2,084,681 | Grun | June 2 2,1937 |
| 2,171,052 | Tatter | Aug. 29, 1939 |
| 2,230,262 | Pollack | Feb. 4, 1941 |
| 2,134,414 | Norcross | Oct. 25, 1938 |
| 2,362,832 | Land | Nov. 14, 1944 |
| 947,490 | Gwozdz | Jan. 25, 1910 |
| 2,064,812 | Bouchard | Dec. 22, 1936 |
| 2,311,840 | Land | Feb. 23, 1943 |
| 2,029,170 | Hull | Jan. 28, 1936 |
| 1,934,484 | Camilli | Nov. 7, 1933 |
| 1,860,967 | Tate | May 31, 1932 |
| 1,291,636 | Brodsky | Jan. 14, 1919 |
| 2,167,484 | Berry | July 25, 1939 |

FOREIGN PATENTS

| Number | Country | Date |
| --- | --- | --- |
| 83,912 | Austria | May 10, 1921 |